(12) United States Patent　　　　(10) Patent No.:　US 12,625,759 B2

Manchester et al.　　　　　　　　　　(45) Date of Patent:　　May 12, 2026

(54) REMEDIATING CHARACTERISTICS OF CONTENT CAPTURED BY A RECORDING APPLICATION ON A USER DEVICE

(71) Applicant: SMULE, INC., San Francisco, CA (US)

(72) Inventors: Chris Manchester, San Francisco, CA (US); Mark Gill, Knoxville, TN (US); Randal Leistikow, Windsor, CO (US)

(73) Assignee: Smule, Inc., San Francisco, CA (US)

( * ) Notice: Subject to any disclaimer, the term of this patent is extended or adjusted under 35 U.S.C. 154(b) by 0 days.

(21) Appl. No.: 17/819,914

(22) Filed: Aug. 15, 2022

(65) Prior Publication Data

US 2024/0054044 A1　　Feb. 15, 2024

(51) Int. Cl.
　　　*G06F 11/07*　　　(2006.01)
　　　*G06F 11/32*　　　(2006.01)

(52) U.S. Cl.
　　　CPC ...... *G06F 11/0793* (2013.01); *G06F 11/0754* (2013.01); *G06F 11/327* (2013.01)

(58) Field of Classification Search
　　　CPC . G06F 11/0793; G06F 11/0754; G06F 11/327
　　　USPC .............................................................. 714/2
　　　See application file for complete search history.

(56) References Cited

U.S. PATENT DOCUMENTS

| | | | | | |
|---|---|---|---|---|---|
| 5,337,350 | A | * | 8/1994 | Kuwahara .......... | H04N 1/32732 |
| | | | | | 379/100.16 |
| 5,757,788 | A | * | 5/1998 | Tatsumi .................... | H04J 3/22 |
| | | | | | 370/347 |
| 5,812,534 | A | * | 9/1998 | Davis .................. | H04L 65/4053 |
| | | | | | 370/537 |
| 6,233,319 | B1 | * | 5/2001 | Cox ...................... | H04M 3/533 |
| | | | | | 379/406.01 |
| 9,544,306 | B2 | * | 1/2017 | Brannon ................. | G06F 21/45 |
| 11,079,918 | B2 | * | 8/2021 | Rotta ................. | A63B 22/0664 |
| 11,423,911 | B1 | * | 8/2022 | Fu ........................... | G10L 15/26 |
| 2011/0219258 | A1 | * | 9/2011 | Cooper ................. | H04N 5/765 |
| | | | | | 714/48 |
| 2014/0053238 | A1 | * | 2/2014 | Brannon ................ | G06F 21/45 |
| | | | | | 726/4 |
| 2014/0180668 | A1 | * | 6/2014 | Nasu ....................... | G06F 40/40 |
| | | | | | 704/2 |
| 2021/0014591 | A1 | * | 1/2021 | Kim ....................... | H04R 1/028 |
| 2021/0208842 | A1 | * | 7/2021 | Cassidy ................ | G05B 15/02 |

(Continued)

*Primary Examiner* — Shelly A Chase
*Assistant Examiner* — Osman M Alshack
(74) *Attorney, Agent, or Firm* — Sterne, Kessler, Goldstein & Fox P.L.L.C.

(57)　　　　　　ABSTRACT

Disclosed herein are system, method, and computer program product aspects for According to some aspects, a computing device (e.g., a server, a cloud-based device, an application-service device, etc.) may identify a characteristic of content received via a recording application on a user device (e.g., a mobile device, a smart device, a computing device, etc.). A type of the user device may be determined based on an identifier received with the content. Based on the type of the user device, an instruction may be sent to the user device that causes a change in an operational state of a component of the user device that is utilized by the recording application. Remediation instructions that remediate the characteristic of the content may be sent to the user device based on an indication of the change in the operation state of the audio component.

20 Claims, 5 Drawing Sheets

300

(56) References Cited

U.S. PATENT DOCUMENTS

| | | | |
|---|---|---|---|
| 2021/0263819 A1* | 8/2021 | Siddapura Kallappa | .................... G06F 11/3414 |
| 2022/0270638 A1* | 8/2022 | Zhang | .................... G10L 25/78 |

* cited by examiner

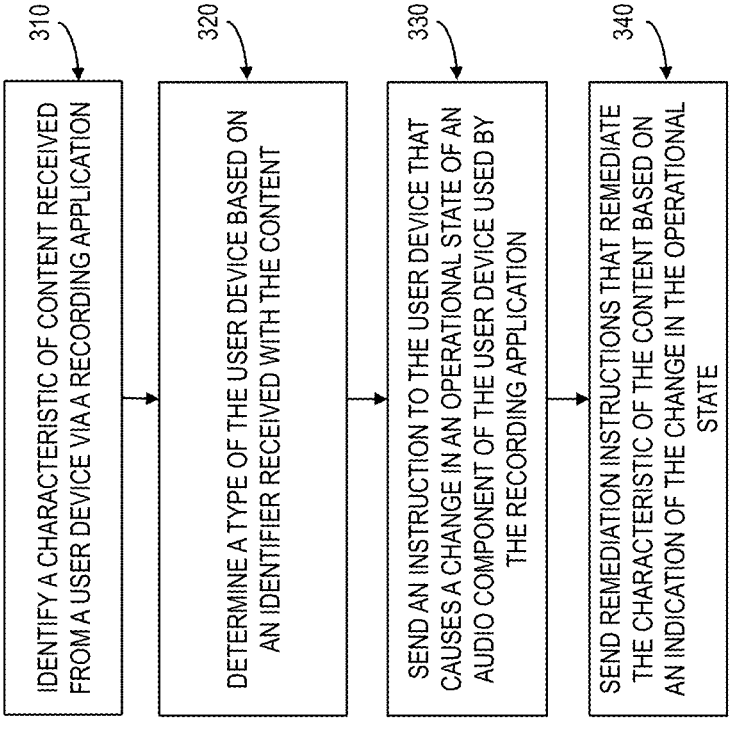

300

310 — IDENTIFY A CHARACTERISTIC OF CONTENT RECEIVED FROM A USER DEVICE VIA A RECORDING APPLICATION

320 — DETERMINE A TYPE OF THE USER DEVICE BASED ON AN IDENTIFIER RECEIVED WITH THE CONTENT

330 — SEND AN INSTRUCTION TO THE USER DEVICE THAT CAUSES A CHANGE IN AN OPERATIONAL STATE OF AN AUDIO COMPONENT OF THE USER DEVICE USED BY THE RECORDING APPLICATION

340 — SEND REMEDIATION INSTRUCTIONS THAT REMEDIATE THE CHARACTERISTIC OF THE CONTENT BASED ON AN INDICATION OF THE CHANGE IN THE OPERATIONAL STATE

FIG. 3

REMEDIATING CHARACTERISTICS OF CONTENT CAPTURED BY A RECORDING APPLICATION ON A USER DEVICE

BACKGROUND

User devices (e.g., mobile devices, smart devices, computing devices, etc.) facilitate and/or enable musical experiences and performances for users, for example, via music applications (e.g., karaoke-based applications, recording applications, etc.) and/or the like that allows users to sing along to audio content. Conventionally, due to a disparity of device manufacturers and models, operating systems, audio hardware, available audio software subsystems, and/or the like, the behavior and final results of a real-time audio capture cannot be reliably predicted and/or controlled for user devices operating music applications and/or the like. Content capture/recording and/or performance behavior is routinely affected by content characteristics and/or issues including, but not limited to, variable latency (e.g., caused by requiring a user's audio performance and/or voice capture and an associated background music track to be time-aligned to yield the best final mixed performance, etc.), dropouts and/or missing content, background noise, distortion, overload, and/or the like. Conventional systems are unable to mitigate (or even recognize) the content characteristics and/or issues that routinely affect content capture/recording and/or performance behavior. The inability of conventional systems to mitigate (or even recognize) the content characteristics and/or issues that routinely affect content capture/recording and/or performance behavior affects the usability and/or experience of the user of conventional recording applications.

BRIEF DESCRIPTION OF THE DRAWINGS

The accompanying drawings are incorporated herein and form a part of the specification.

FIG. 3 shows a flowchart of an example method for for remediating characteristics of content captured by a recording application on a user device, according to some aspects.

In the drawings, like reference numbers generally indicate identical or similar elements. Additionally, generally, the left-most digit(s) of a reference number identifies the drawing in which the reference number first appears.

SUMMARY

Figure 1:
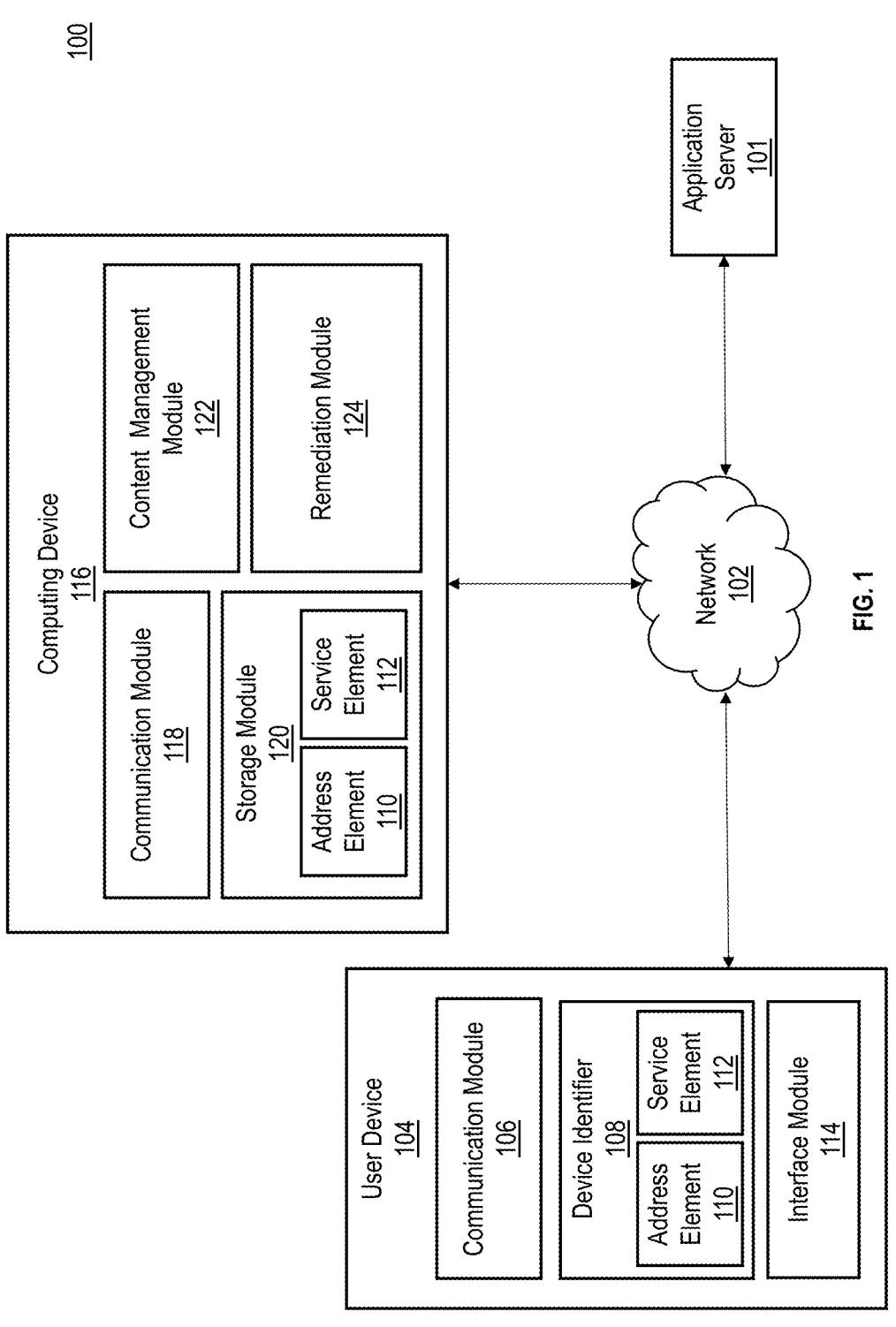
FIG. 1 is a block diagram of an example system for remediating characteristics of content captured by a recording application on a user device, according to some aspects.

Provided herein are system, apparatus, article of manufacture, method and/or computer program product aspects, and/or combinations and sub-combinations thereof, for remediating characteristics of content captured by a recording application on a user device. According to some aspects, the system, apparatus, article of manufacture, method and/or computer program product aspects, and/or combinations and sub-combinations thereof, for remediating characteristics of content captured by a recording application on a user device provide a uniform experience (e.g., utilizing a recording application) across heterogeneous user devices (e.g., mobile devices, smart devices, etc.) and are not limited to any single type, class, configuration, and/or model user device. Remediation instructions may be identified (and/or curated) and provided to any user device. According to some aspects, different remediation instructions may be sent to different user devices, for example, based on the type, class, configuration, model, and/or the like.

According to some aspects, a computing device (e.g., a server, a cloud-based device, an application-service device, etc.) may identify a characteristic of content received via a recording application on a user device (e.g., a mobile device, a smart device, a computing device, etc.). A type of the user device may be determined based on an identifier received with the content. Based on the type of the user device, an instruction may be sent to the user device that causes a change in an operational state of a component of the user device that is utilized by the recording application. Remediation instructions that remediate the characteristic of the content may be sent to the user device based on an indication of the change in the operation state of the audio component.

DETAILED DESCRIPTION

Provided herein are system, apparatus, device, method and/or computer program product aspects, and/or combinations and sub-combinations thereof, for remediating characteristics of content captured by a recording application on a user device. The system, apparatus, device, method, computer program product embodiments, and/or combinations and sub-combinations thereof for remediating characteristics of content captured by a recording application on a user device described herein enable a user of a user device (e.g., a user device operating and/or configured with a recording application, etc.) to be presented (e.g., via an interface of the user device, etc.) with a musical backing track, song/music lyrics, and/or visual pitch-guides to submit content to a computing device, for example, in a Karaoke-based scenario. For example, an audio capturing/recording component (e.g., a microphone, a speaker, etc.) of the user device may capture the user's voice as they sing a song. The computing device (e.g., the computing device operating and/or configured with the recording application, etc.) and/or the user device may mix audio content comprising the user's voice with the backing track to generate composite audio content including the user's voice and the backing track. Content characteristics (and/or issues) include, but are not limited to, variable latency (e.g., caused by requiring a user's audio performance and/or voice capture and an associated background music track to be time-aligned to yield the best final mixed performance, etc.), dropouts and/or missing content, background noise, distortion, overload, and/or the like affecting the composite audio content may be detected and remediated by device-specific remediation instructions to improve the usability of a recording application and/or related computer program/application for an end-user. For example, the system, apparatus, device, method, computer program product embodiments, and/or combinations and sub-combinations thereof for remediating characteristics of content captured by a recording application on a user device described herein enable various user devices to be whitelisted or blacklisted based on their type and/or configuration. A whitelist or blacklist indication for a user device may be used to determine how a user device is permitted to associate and/or operate with a recording application and/or what remediation instructions and/or configuration settings are provided to the user device if any unfavorable characteristics and/or issues with content acquisition, recording, mixing, reception, and/or the like are detected, determined, and/or identified. Remediation instructions and/or configuration settings suitable for a user device to operate effectively with a recording application may be stored for future use. The storing of remediation instructions and/or configuration settings suitable for a user device to operate effectively with a recording application enables computational resources required to mitigate operational issues with the recording application to be preserved. These and other technological advantages are described herein.

FIG. 1 shows an example system 100 for remediating characteristics of content captured by a recording application on a user device. The system 100 is merely an example of one suitable system environment and is not intended to suggest any limitation as to the scope of use or functionality of aspects described herein. Neither should the system 100 be interpreted as having any dependency or requirement related to any single module/component or combination of modules/components described therein.

The system 100 may include a network 102. The network 102 may include a packet-switched network (e.g., internet protocol-based network), a non-packet switched network (e.g., quadrature amplitude modulation-based network), and/or the like. The network 102 may include network adapters, switches, routers, modems, and the like connected through wireless links (e.g., radiofrequency, satellite) and/or physical links (e.g., fiber optic cable, coaxial cable, Ethernet cable, or a combination thereof). The network 102 may include public networks, private networks, wide area networks (e.g., Internet), local area networks, and/or the like. The network 102 may include a content access network, content distribution network, and/or the like. The network 102 may provide and/or support communication from telephone, cellular, modem, and/or other electronic devices to and throughout the system 100. For example, the system 100 may include a user device 104 in communication with a computing device 116 and/or an application server 101 via the network 102.

According to some aspects, application server 101 may provide services related to applications. The application server 101 may run one or more application services to provide data, handle requests, and/or otherwise facilitate operation of applications for a device, such as the user device 104, the computing device 116, and/or any other device/component of the system 100. The application server 101 may have an application store. The application store may be configured to allow users to purchase, download, install, upgrade, and/or otherwise manage applications. The application server 101 may allow applications to be downloaded to a device, such as the user device 104, the computing device 116, and/or any other device/component of the system 100. For example, the application server 101 may allow the user device 104 and/or the computing device 116 to download a content (e.g., audio, video, multimedia, etc.) recording application (and/or application programming interface (API)). The recording application may include services, libraries, code, combinations thereof, and/or the like. The recording application may enable the user device 104 to capture and communicate, send, and/or transmit content to the computing device 116.

According to some aspects, the user device 104 may include a communication module 106 that facilitates and/or enables communication with the network 102 (e.g., devices, components, and/or systems of the network 102, etc.), the computing device 116, the application server 101, and/or any other device/component of the system 100. For example, the communication module 106 may include hardware and/or software to facilitate communication. The communication module 106 may comprise one or more of a modem, transceiver (e.g., wireless transceiver, etc.), digital-to-analog converter, analog-to-digital converter, encoder, decoder, modulator, demodulator, tuner (e.g., QAM tuner, QPSK tuner), and/or the like. The communication module 106 may include any hardware and/or software necessary to facilitate communication.

According to some aspects, the user device 104 may be associated with a user identifier and/or device identifier 108. The device identifier 108 may be any identifier, token, character, string, or the like, for differentiating one user or user device (e.g., user device 104) from another user or user device. The device identifier 108 may identify a user or user device as belonging to a particular class of users or user devices. The device identifier 108 may include information relating to the user device such as a manufacturer, a model or type of device, a service provider associated with the user device 104, a state of the user device 104, a version and/or type of software associated with the user device 104, a locator, and/or a label or classifier. Other information may be represented by the device identifier 108.

According to some aspects, the device identifier 108 may include an address element 110 and a service element 112. The address element 110 may comprise or provide an internet protocol address, a network address, a media access control (MAC) address, an Internet address, or the like. The address element 110 may be relied upon to establish a communication session between the user device 104 and the computing device 104 or other devices and/or networks. The address element 110 may be used as an identifier or locator of the user device 104. The address element 110 may be persistent for a particular network.

According to some aspects, the service element 112 may include an identification of a service provider associated with the user device 104 and/or with the class of user device 104. As described in greater detail later herein, remediation instructions may be determined, identified, generated, and/or curated for user devices of the same class and/or different classes. According to some aspects, there may be multiple classes of user devices, and/or classes of user devices may be based on a variety of characteristics. For example, the class of the user device 104 may be related to a type of device, a type of recording and/or playback hardware (e.g., wired headphones, Bluetooth headsets, external microphones, speakers, etc.), a version and/or type of software associated with the user device 104, a capability of the user device 104 (e.g., over-the-air (OTA) recording capabilities, etc.), a type of service being provided, and/or a level of service (e.g., business class, service tier, service package, etc.). The service element 112 may include information relating to or provided by a communication service provider (e.g., Internet service provider) that is providing or enabling data flow such as communication services to the user device 104. The service element 112 may comprise information relating to a preferred service provider for one or more particular services relating to the user device 104. The address element 110 may be used to identify or retrieve data from the service element 112, or vice versa. According to some aspects, the address element 110 and/or the service element 112 may be stored remotely from the user device 104 and retrieved by one or more devices such as the user device 104 and the computing device 116. Other information may be represented by the service element 112.

According to some aspects, the user device 104 may include an interface module 114. The interface module 114 enables a user to interact with the user device 104, the network 102, the computing device 116, application server 101, and/or any other device/component of the system 100. The interface module 114 may include any interface for presenting and/or receiving information to/from a user.

According to some aspects, the interface module 114 may include a web browser (e.g., INTERNET EXPLORER®, MOZILLA FIREFOX®, GOOGLE CHROME®, SAFARI®, or the like), a recording application (e.g., SMULE®, a recording application received from the application server 101, etc.) and the like. Other software, hardware, and/or interfaces can be used to provide communication between the user device 104, the network 102, the computing device 116, application server 101, and/or any other device/component of the system 100. The interface module 114 may request/query, send/provide, and/or receive various files from a local source and/or a remote source, such as the computing device 116, application server 101, and/or any other device/component of the system 100.

According to some aspects, the interface module 114 may include one or more input devices and/or components, for example, such as a keyboard, a pointing device (e.g., a computer mouse, remote control), microphones, tactile input devices (e.g., touch screen, gloves, etc.), and/or the like. According to some aspects, interaction with the input devices and/or components of the interface module 108 may enable a user to view, access, request, and/or navigate a user interface generated, accessible, and/or displayed by the interface module 108. According to some aspects, components of the interface module and/or computing device 104 including, but not limited to, microphones, cameras, tactile sensors, displays, and/or the like, may be utilized by a recording application and/or the like. According to some aspects, interaction with the input devices and/or components of the interface module 108, for example, via (and/or in association with) a recording application and/or the like, may enable a user to engage in an online, and/or application-based sing-a-long experience (e.g., Karaoke, etc.) via the user device 104.

According to some aspects, a user of the user device 104 may be presented (e.g., via an interface of the user device, etc.) with a musical backing track, song/music lyrics, and/or visual pitch guides to submit content to the computing device 116, for example, in including but not limited to, a Karaoke-based scenario. For example, the interface module 108 may capture content (e.g., a user's voice as they sing a song to a backtrack, etc.) that may be mixed with additional content (e.g., a backing track, etc.) to generate composite content (e.g., composite audio content, a multi-track recording, composite video, composite multimedia content, etc.). For example, composite content may include, but is not limited to, audio content indicative of the voice of a user of the user device 104, a backing track, and/or the like. For example, according to some aspects, audio content indicative of the voice of a user of the user device 104 and a backing track may be sent to the computing device 116 to be mixed. Depending on a type of the user device 104, a configuration/setting of the user device 104, software (e.g. a software type, a software version, a software configuration, etc.) configured with and/or associated with the user device 104, and/or the like, a mix (e.g., composite recording, composite content, etc.) of the audio content indicative of the voice of the user of the user device 104 and the backing track may be included with and/or be associated with content characteristics (and/or issues). Such content characteristics include, but are not limited to, variable latency (e.g., caused by requiring the audio content indicative of the voice of the user of the user device 104 and the backing track to be time-aligned to yield the best final mixed performance, etc.), dropouts and/or missing content, background noise, distortion, overload, and/or the like.

According to some aspects, the computing device 116 may facilitate and/or enable remediation of any content characteristics (and/or issues) affecting composite audio content (and/or an attempt to generate composite content). For example, the computing device 116 may determine, detect, and/or identify any content characteristics affecting composite audio content including, but not limited to, variable latency (e.g., caused by requiring the audio content indicative of the voice of the user of the user device 104 and the backing track to be time-aligned to yield the best final mixed performance, etc.), dropouts and/or missing content, background noise, distortion, overload, and/or the like. The computing device 116 may generate, determine, detect, and/or identify device-specific (and/or class-specific) remediation instructions to remediate any content characteristics affecting composite content. Although shown separately, according to some aspects, the user device 104 may include the computing device 116 (or vice versa), and/or the user device 104 may be configured to perform functions, methods, steps, and/or actions performed by the computing device 116 (or vice versa) to remediate characteristics of content captured by a recording application on a user device.

According to some aspects, the computing device 116 may include a communication module 118 that facilitates and/or enables communication with the network 102 (e.g., devices, components, and/or systems of the network 102, etc.), the user device 104, the application server 101, and/or any other device/component of the system 100. For example, the communication module 118 may include hardware and/or software to facilitate communication. The communication module 118 may comprise one or more of a modem, transceiver (e.g., wireless transceiver, etc.), digital-to-analog converter, analog-to-digital converter, encoder, decoder, modulator, demodulator, tuner (e.g., QAM tuner, QPSK tuner), and/or the like. The communication module 118 may include any hardware and/or software necessary to facilitate communication.

According to some aspects, the computing device 116 may include a storage module 120. The storage module 120 may store remediation instructions, device-specific information (e.g., device identifiers, information indicating whitelisted user devices, information indicating blacklisted user devices, device model and software version information, user device configuration/settings information, etc.), user identifiers or records, and/or any other information. For example, the storage module 120 may store information relating to the user device 104 such as the address element 110, the service element 112, remediation instructions, device-specific information (e.g., device identifiers, information indicating whitelisted user devices, information indicating blacklisted user devices, device model and software version information, user device configuration/settings information, etc.), user identifiers or records, and/or any other information. The computing device 116 may obtain the device identifier 108 from the user device 104 and retrieve information from the storage module 120 such as the address element 110, the service element 112, remediation instructions, device-specific information (e.g., device identifiers, information indicating whitelisted user devices, information indicating blacklisted user devices, device model and software version information, user device configuration/settings information, etc.), user identifiers or records, and/or any other information. The computing device 104 may obtain the address element 110 from the user device 104 and may retrieve the service element 112 from the storage module 120, or vice versa. Any information may be stored in and retrieved from the storage module 120. The storage module 120 may be disposed remotely from the computing device 116 and accessed via direct or indirect connection and/or communication. The storage module 120 may be integrated with the computing device 116 or some other device and/or component of the system 100.

According to some aspects, the computing device 116 may include a content management module 122. The content management module 122 may mix content, generate composite content, and/or the like. For example, the content management module 122 may mix content, generate composite content, and/or the like using various processes such as equalization, compression, reverb, pitch correction, harmonization, chorus, delay, and/or the like. The content management module 122 may generate high fidelity and/or high-quality recordings by adjusting levels, panning, and time-based audio effects (chorus, reverb, delay), of content (e.g., voice content, backing track, etc.) received from the user device 104.

According to some aspects, the content management module 122 may determine, detect, and/or identify any content characteristics (and/or issues) affecting composite audio content (and/or efforts to generate composite content) including, but not limited to, variable latency (e.g., caused by requiring the audio content indicative of the voice of the user of the user device 104 and the backing track to be time-aligned to yield the best final mixed performance, etc.), dropouts and/or missing content, background noise, distortion, overload, and/or the like.

For example, according to some aspects, the content management module 122 may determine, detect, and/or identify silence characteristics (e.g., perfect silence, DC silence, etc.). A determination, detection, and/or identification of silence characteristics associated with content sent to and/or received by the content management module 122 may indicate an error with the content and/or a failure to send/receive the content. For example, a determination, detection, and/or identification of silence characteristics for a preset duration, amount of time, and/or time window (e.g., X amount of seconds after a recording has started, etc.), may indicate an error with the content and/or a failure to send/receive the content.

For example, according to some aspects, depending on a type of the user device 104, a configuration/setting of the user device 104, software (e.g. a software type, a software version, a software configuration, etc.) configured with and/or associated with the user device 104, and/or the like, a "perfect silence" may occur when content is received from the user device 104 to be mixed and/or generate a recording.

According to some aspects, "perfect silence" may be defined as an audio stream that contains only zero values. The content management module 122 may determine, detect, and/or identify the occurrence of "perfect silence" even though "perfect silence" is an unusual occurrence for a microphone signal (e.g., routinely an amount of noise may be detected with a microphone signal). A "perfect silence" condition is an indicator that the silence perceived by the content management module 122 is due to a hardware malfunction or configuration setting of a user device (e.g., the user device 104, etc.). For example, a "perfect silence" condition may be encountered with certain types of mobile phones due to an audio sharing policy of a company, business, and/or entity providing the types of mobile phones.

According to some aspects, the content management module 122 may determine, detect, and/or identify a "perfect silence" condition by monitoring all data/information received from the user device (e.g., passing through the system 100, etc.) to determine, detect, and/or identify when all input values are zero.

According to some aspects, depending on the type of the user device 104, a configuration/setting of the user device 104, software (e.g. a software type, a software version, a software configuration, etc.) configured with and/or associated with the user device 104, and/or the like, an underrun scenario and/or an overrun scenario may occur when content is sent/received from the user device 104 to be mixed and/or generate a recording. According to some aspects, underrun scenarios and/or overrun scenarios may occur when the system 100 cannot deliver input or output content (e.g., audio, etc.) due to the content not being ready to meet a real-time deadline of supporting hardware (e.g., audio hardware, etc.).

According to some aspects, depending on a type of the user device 104, a configuration/setting of the user device 104, software (e.g. a software type, a software version, a software configuration, etc.) configured with and/or associated with the user device 104, and/or the like, a "DC silence" may occur when content is received from the user device 104 to be mixed and/or generate a recording. A "DC silence" condition may occur when content received from the user device 104 has a low dynamic range with a DC offset. According to some aspects, Settings 1 below is provided as example settings for the content management module 122 to determine, detect, and/or identify DC silence associated with content received from the user device 104. For example, given an audio stream (x[n]) of length (N)), DC silence may be determined, detected, and/or identified. The system, apparatus, device, method, and/or computer program product embodiments, and/or combinations and sub-combinations thereof for remediating characteristics of content captured by a recording application on a user device are not limited to Settings 1 and other settings, algorithms, and/or the like may be used in accordance with aspects described herein.

Settings 1
Values:
1. MaxAmp=max(x[0:N])
2. sum=accumulate(x[0:N])
3. DCComponent=abs(sum/N)
4. AmpAdjusted=maxAmp−DCComponent
5. bool DCSilence=AmpAdjusted<=threshold According to some aspects, the threshold in the fifth set of values of Settings 1 may be set, for example, between the range of −80 dB and −60 dB. According to some aspects, the threshold may be based on a measured minimum detectable signal for audio (and/or any other type of content) and may be varied, modified, and/or adjusted, for example, based on a user device and/or attributes of a user device (e.g., device type, settings, configurations, installed software, etc.).

According to some aspects, the content management module 122 may determine, detect, and/or identify a silence condition and/or scenario associated with content (or any other characteristics, issues, and/or conditions affecting content) received from the user device 104 according to a minimum amount of content (e.g., minimum input, etc.) received from the user device 104. For example, the content management module 122 may determine, detect, and/or identify a silence condition and/or scenario associated with content received from the user device 104 once a threshold level of content is received from the user device 104.

According to some aspects, the threshold level may be based on an amount of content received and/or an amount of time for which content is received by the content management module 122. According to some aspects, the content management module 122 may determine, detect, and/or identify a leading zero condition associated with the content. According to some aspects, a leading zero may be defined as an audio datum that is perfectly zero, and is present before a non-zero value. A determination, detection, and/or identification of content characteristic of a leading zero informs the content management module 122 of a minimum input problem/issue associated with content sent to the content management module 122 by the user device 104 and/or the like.

According to some aspects, whenever any content characteristic (and/or issue) associated with content sent to the computing device 116 (e.g., the content management module 122, etc.) is determined, detected, and/or identified, for example, including, but not limited to, perfect silence, DC silence, variable latency (e.g., caused by requiring the audio content indicative of the voice of the user of the user device 104 and the backing track to be time-aligned to yield the best final mixed performance, etc.), dropouts and/or missing content, background noise, distortion, overload, and/or the like, one or more remedial measures and/or workarounds may be implemented, facilitated, and/or enabled. The one or more remedial measures and/or workarounds may be implemented, facilitated, and/or enabled by the computing device 116, the user device 104, and/or the like.

According to some aspects, the computing device 116 may include a remediation module 124. The remediation module 124 may implement, facilitate, and/or enable one or more remedial measures and/or workarounds whenever any content characteristic (and/or issue) associated with content sent to the computing device 116 is determined, detected, and/or identified. For example, the content management module 122 may inform the remediation module 124 of any content characteristic (and/or issue) associated with content sent to the computing device 116 that is determined, detected, and/or identified.

As previously described herein, determination, detection, and/or identification of silence associated with content sent to (e.g., streamed to, etc.) the computing device 116 may indicate an error with the content and/or a failure to send/receive the content. For example, a determination, detection, and/or identification of silence for a preset duration, amount of time, and/or time window (e.g., X amount of seconds after a recording has started, etc.), may indicate an error with the content and/or a failure to send/receive the content.

According to some aspects, whenever silence associated with content sent to (e.g., streamed to, etc.) the computing device 116 is determined, detected, and/or identified by the content management module 122, the content management module 122 may inform the remediation module 124 and the remediation module 124 may cause the content stream (e.g., an audio stream, a video stream, a multimedia stream, etc.) to be restarted with one or more remedial measures and/or workarounds. According to some aspects, the one or more remedial measures and/or workarounds may be either device-specific or device-agnostic.

According to some aspects, the remediation module 124 may implement remedial measures and/or workarounds according to a listing for user devices (e.g., a whitelist indicating user devices, a blacklist indicating user devices, etc.). A listing for user devices for example, stored by the storage module 120 and/or the like, may be used to determine how a user device is permitted to associate and/or operate with a recording application instantiated on the user device 104 and/or the computing device 116.

For example, according to some aspects, the remediation module 124 may access a blacklist and/or the like and determine that a type of user device 104 and/or a class of user device 104 (e.g., a user device configured in a particular way, etc.) may not be permitted to stream content to a recording application due to the type of user device and/or particular configuration being known to be associated with one or more content characteristics.

According to some aspects, the remediation module 124 may access a whitelist and/or the like and determine that a type of user device 104 and/or a class user device 104 may be permitted to stream content to a recording application and/or be associated with one or more remediation instructions due to the type of user device and/or particular configuration being known to be associated with one or more content characteristics or known to be disassociated with one or more content characteristics.

According to some aspects, when the remediation module 124 is informed of one or more content characteristics associated with content being streamed to the computing device 116 to be mixed, the remediation module 124 determines a type of the user device based on an identifier received with the content. The remediation module 124 may send an instruction to the user device (e.g., the user device 104, etc.) that causes a change in an operational state of a component of the user device that is utilized by a recording application used to stream the content based on the type of the user device. For example, the remediation module 124 may send an instruction to the user device that causes microphones and/or other audio components of the user device to restart. After the operational state of the component (and/or the component itself) of the user device that is utilized by the recording application is restarted, the remediation module 124 may send a remediation instruction to the user device.

For example, according to some aspects, the remediation module 124 may send a remediation instruction to a user device that causes the user device to change from a first voice receiving component of the user device to a second voice receiving component of the user device. According to some aspects, the remediation instruction may be specific to and/or associated with a type and/or class of the user device. For example, a lookup table and/or the like may indicate remediation instructions and/or components associated with and/or affected by remediation instructions for user devices based on any type, class, and/or the like of the user devices.

According to some aspects, the remediation module 124 may send a remediation instruction to a user device that causes the user device (and/or the computing device 116) to identify and/or determine an alternative microphone. According to some aspects, an alternate microphone may be selected if it is of the same type of microphone used in an original attempt to stream content for recording/mixing. Various types of microphones may include, but are not limited to, on-board microphones, headsets, USB microphones, and/or the like.

According to some aspects, the remediation module 124 may send a remediation instruction to a user device (e.g., the user device 104, etc.) that causes the user device to change a configuration setting for the user device. For example, certain types of user devices may include configurations and/or presets that determine the type of content stream used by the user device. Remediation instruction may be curated to address the type/class of user device and/or a type of content stream used by the user device. In other words, according to some aspects, the configuration setting may be specific to and/or associated with a type and/or class of the user device. For example, a user device configured with an older version of software and/or the like may have configuration settings that are remediated differently by remediation instructions than the same type of user device with a newer version of software and/or the like.

According to some aspects, certain types of user devices may include manufacturer configurations and/or presets (e.g., input presets, performance mode, operating settings, etc.) intended for telephony applications that may cause content characteristics associated with content being streamed to the computing device 116 be determined, detected, and/or identified. The remediation module 124 may send a remediation instruction to a user device that causes a change to any manufacturer configurations and/or presets (e.g., input presets, performance mode, operating settings, etc.) intended for telephony applications.

According to some aspects, the remediation module 124 may send a remediation instruction to a user device that causes the user device to select a content stream type for the user device. As described, certain types of user devices may include configurations and/or presets (e.g., MMAP, etc.) that determine the type of content stream used by the user device. The default content stream used by the user device may cause content characteristics associated with content being streamed to the computing device 116 may be determined, detected, and/or identified. The remediation module 124 may send a remediation instruction to a user device that causes a change in a selected content stream type for the user device.

According to some aspects, in situations and/or scenarios when the remediation module 124 is informed of content characteristics associated with content being streamed to the computing device 116 being determined, detected, and/or identified, and the remediation module 124 is unable to identify and/or access a remediation instruction for a user device (e.g., the user device 104, etc.), the remediation module 124 may send a notification to the user device that facilitates remediation of the characteristic of the content. For example, the user device may display the notification to a user of the user device via a recoding application, prompting the user to take actions to remediate the characteristic of the content.

Figure 2A:
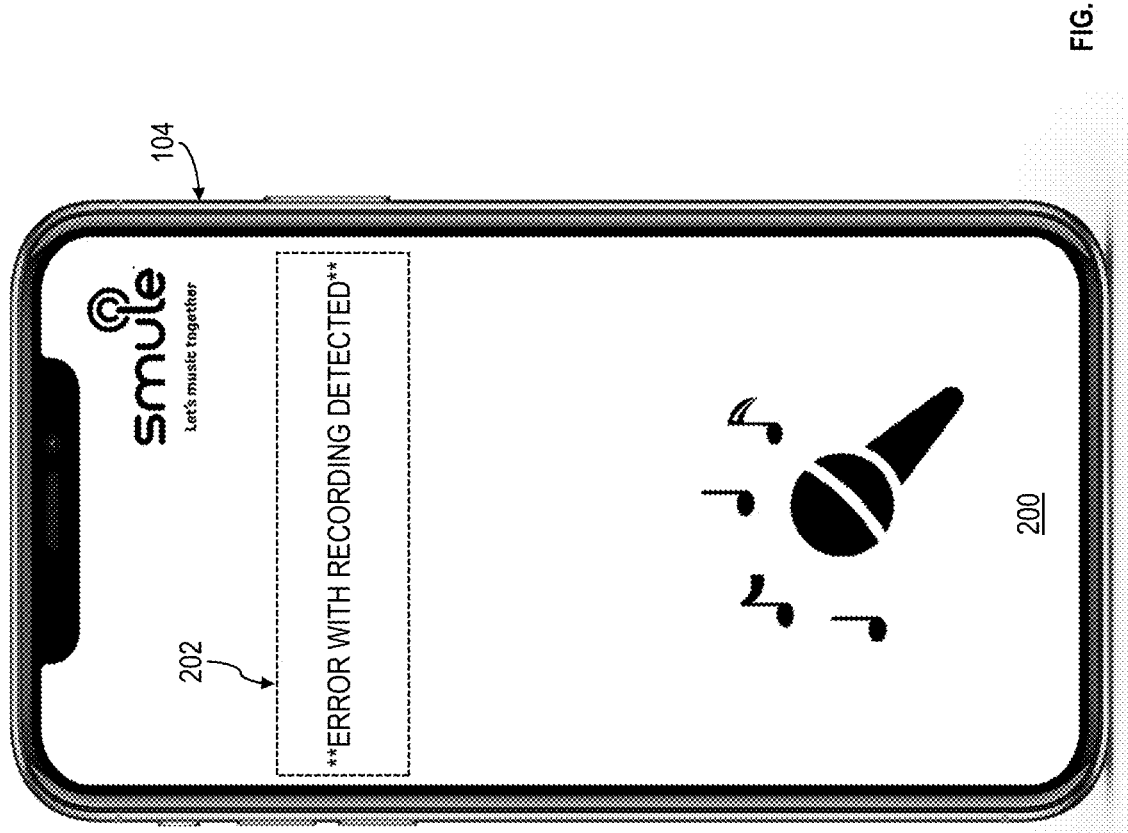
FIGS. 2A-2B show an example user interface for remediating characteristics of content captured by a recording application on a user device, according to some aspects.

FIG. 2A shows an example user interface for remediating characteristics of content captured by a recording application on a user device. A user interface 200 of the user device 104 may be associated with and/or generated for a recording application on the user device 104. The user interface 200 may display a notification 202 that indicates that characteristics of content captured by the recording application to generate a recording (e.g., composite content, etc.) have been detected, determined, and/or identified.

Figure 2B:
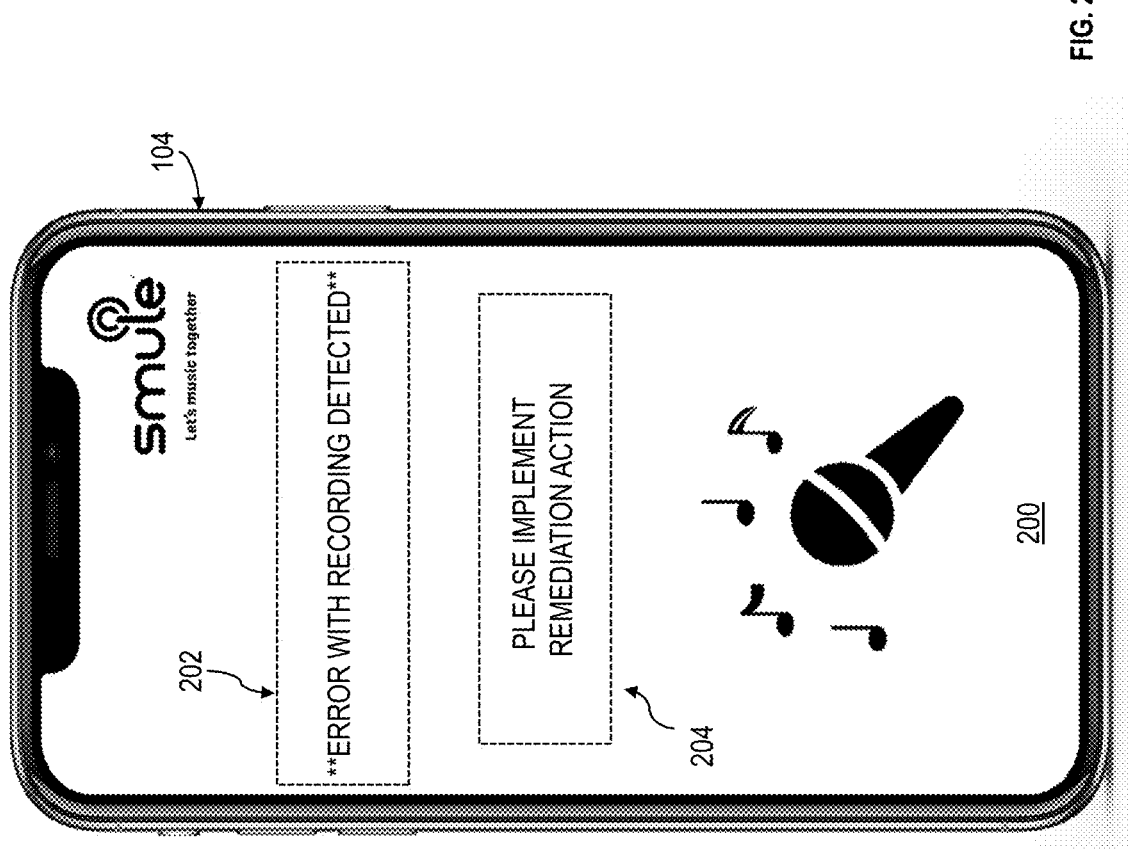

FIG. 2B shows an example user interface for remediating characteristics of content captured by a recording application on a user device. According to some aspects, in situations and/or scenarios when the computing device 116 determines, detects, and/or identifies content characteristics associated with content being streamed to the computing device 116 and remediation instructions are unavailable for the user device 104 and/or the computing device 116 is unable to identify and/or access a remediation instruction for the user device 104, the computing device 116 may send a notification 204 to the user device that, when displayed by the user device 104, causes a user of the user device to implement one or more remediation action. According to some aspects, a remediation action may include, but is not limited to: verification of a mode (e.g., Karaoke mode, etc.), setting, and/or configuration for a user device; a restart of a recording application and/or the user device, a change to a mode, setting, and/or configuration for a user device, and/or the like; any other remediation action associated with a user device.

FIG. 3 shows a flowchart of an example method 300 for remediating characteristics of content captured by a recording application on a user device, according to some aspects. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art. Method 300 shall be described with reference to FIGS. 1-2B. However, method 300 is not limited to the aspects of those figures.

In 310, computing device 106 identifies a characteristic of content (e.g., audio content, video content, multimedia content, etc.) received via a recording application on a user device (e.g., a mobile device, a smart device, the computing device 104, etc.). The characteristic of the content may include and/or indicate an error with the content, a degradation of the content, an unfavorable aspect of the content, and/or the like. For example, when the content includes audio, the identified characteristic may include a detected silence, sound distortion, high/low pitched/frequency audio, and/or any other characteristic of content that may be identified as an error and/or the like.

According to some aspects, computing device 106 may identify the characteristic of content by determining and/or detecting a "perfect silence scenario" associated with the content. For example, computing device 106 may identify the characteristic of content by determining and/or detecting an amount of zero values associated with the content received within a time period satisfy a threshold. According to some aspects, computing device 106 may identify the characteristic of content by determining and/or detecting at least one of an underrun scenario or an overrun scenario occurring with the content such that either an input portion of the content or an output potion of the content cannot be sent according to a realtime deadline of hardware of the user device and/or the computing device 106. According to some aspects, computing device 106 may identify the characteristic of content by determining and/or detecting a "DC silence scenario" associated with the content. For example, computing device 106 may identify the characteristic of content by determining and/or detecting that deviations in an amount of direct current (DC) voltage associated with the content received within another time period are less than another threshold. According to some aspects, computing device 106 may identify the characteristic of content by determining and/or detecting that a direct current (DC) offset for the content received within another time period has a dynamic range below a threshold (e.g., a low dynamic range with a DC offset, etc.).

In 320, computing device 106 determines a type of the user device. According to some aspects, computing device 106 may determine the type of the user device based on an identifier received with the content. For example, according to some aspects, computing device 106 may access user device identification information (e.g., user device identification information stored in a local and/or remote storage, etc.) that indicates different types of a plurality of user devices, software version information for the plurality of user devices, and/or device configuration information for the plurality of user devices. Accordingly, remediation instructions and/or signals/instructions for manipulating (e.g., resetting, switching, etc.) user device components may be determined, identified, generated, and/or curated based on a type and/or class of user device.

For example, according to some aspects, user device identification information may include an identifier that indicates the type of the user device and at least one of a software version for the user device or a configuration (e.g., Karaoke mode, etc.) for the user device. The computing device 106 may match the identifier received with the content to the identifier that indicates the type of the user device and at least one of the software version for the user device or the configuration for the user device based on the user device identification information.

In 330, computing device 106 sends an instruction to the user device that causes a change in an operational state of a component of the user device. According to some aspects, computing device 106 may send an instruction to the user device that causes a change in the operational state of a component of the user device based on the type of the user device. The component of the user device may be a component that is utilized by the recording application. For example, according to some aspects, the change in the operational state of a component of the user device may include, but is not limited to, a restart, reboot, and/or refresh of audio components of the user device.

In 340, computing device 106 sends remediation instructions to the user device that remediate (and/or facilitate remediation, etc.) the characteristic of the content. According to some aspects, computing device 106 may send the remediation instructions to the user device based on an indication of the change in the operation state of the audio component. For example, the remediation instructions cause the user device to change from a first voice receiving component of the user device to a second voice receiving component of the user device, change a configuration (and/or preset) setting for the user device, select a content stream type (e.g., selectively disable MMAP to cause use of content stream type, etc.) for the user device, and/or the like.

According to some aspects, method 300 may further include computing device 106 causing the user device to display a notification via the recoding application that facilitates remediation of the characteristic of the content. For example, computing device 106 may cause the user device to display a notification via the recoding application that facilitates remediation of the characteristic of the content based at least in part on the identifying the characteristic of the content and the remediation instructions being unavailable for the user device (and sending an instruction to the user device to display the notification).

According to some aspects, method 300 may further include computing device 106 receiving via the recording application additional content. For example, computing device 106 may receive additional content (e.g., audio content, video content, multimedia content, etc.) from the user device based on an indication that the remediation instructions remediated the characteristic of the content.

According to some aspects, method 300 may further include computing device 106 identifying a characteristic of at least a portion of additional content received via the recording application on another user device. The computing device 116 may determine a type of the another user device based on an identifier received with the additional content. The computing device 116 may block the another user device from sending the another portion of the additional content based on the type of the another user device being a type of device restricted from sending content via the recording application, based an identified content characteristic associated with attempts to send the another portion of the additional content, and/or the like.

According to some aspects, method 300 may further include computing device 106 identifying a characteristic of at least a portion of additional content received via the recording application on another user device. The computing device 116 may determine a type of the another user device based on an identifier received with the additional content. The computing device 116 may send an instruction to the another user device that causes a change in an operational state of a component of the another user device based on the type of the another user device. The component of the another user device is utilized by the recording application. The computing device 116 may send remediation instructions to the another user device that remediate the characteristic of the additional content based on an indication of the change in the operation state of the component of the another user device. The remediation instructions that remediate the characteristic of the additional content may be different from the remediation instructions that remediate the characteristic of the content.

Figure 4:
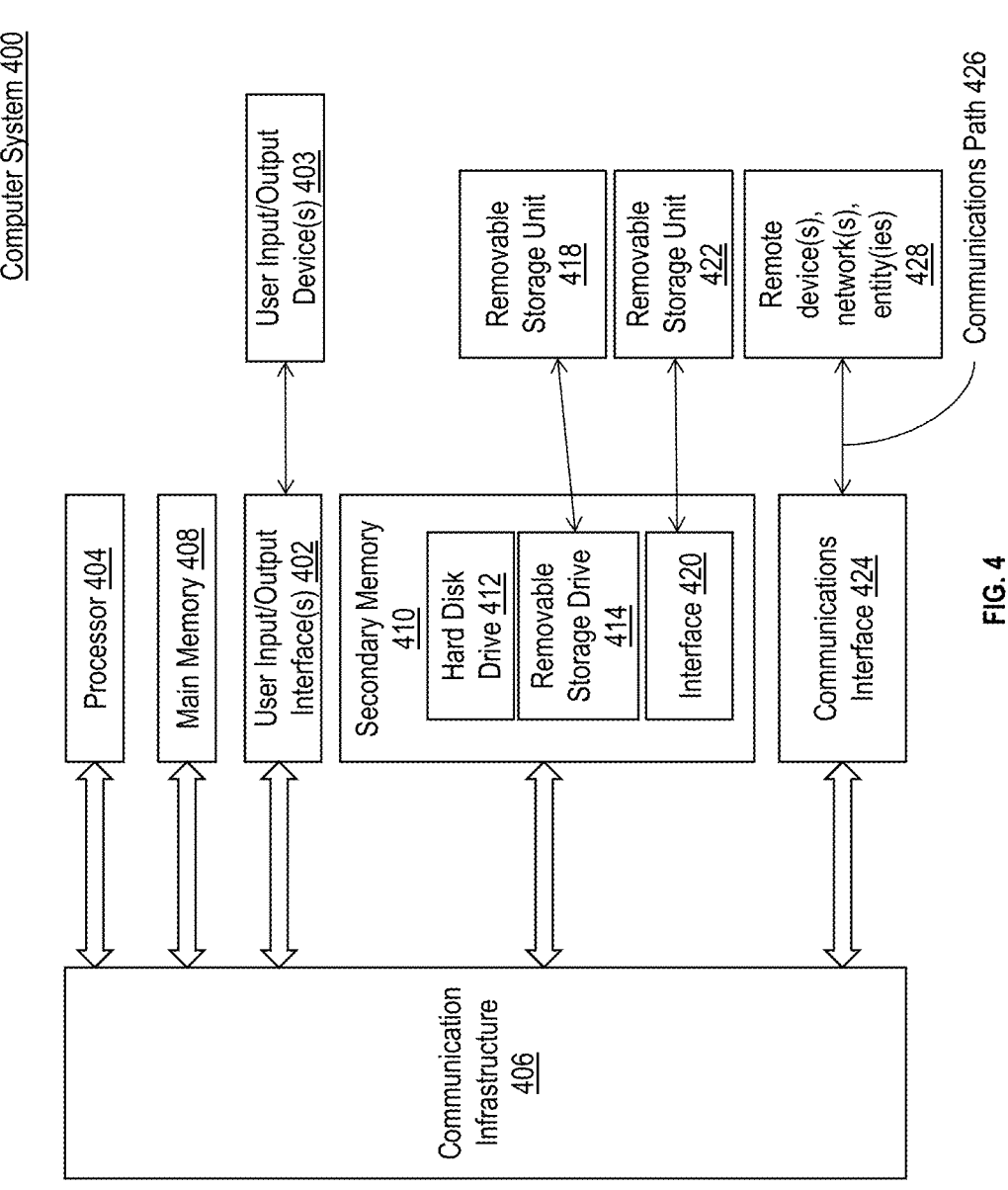
FIG. 4 is an example computer system useful for implementing various aspects.

FIG. 4 is an example computer system useful for implementing various embodiments. Various embodiments may be implemented, for example, using one or more well-known computer systems, such as computer system 400 shown in FIG. 4. One or more computer systems 400 may be used, for example, to implement any of the embodiments discussed herein, as well as combinations and sub-combinations thereof. According to some aspects, the user device 104 of FIG. 1, the computing device 116 of FIG. 1, and/or any other device/component described herein may be implemented using the computer system 400. According to some aspects, the computer system 400 may be used to implement method 300 and/or any other methods and/or steps described herein.

Computer system 400 may include one or more processors (also called central processing units, or CPUs), such as a processor 404. Processor 504 may be connected to a communication infrastructure or bus 406.

Computer system 400 may also include user input/output device(s) 402, such as monitors, keyboards, pointing devices, etc., which may communicate with communication infrastructure or bus 406 through user input/output device(s) 402.

One or more of processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 may also include a main or primary memory 408, such as random access memory (RAM). Main memory 408 may include one or more levels of cache. Main memory 408 may have stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, a tape backup device, and/or any other storage device/drive.

Removable storage drive 414 may interact with a removable storage unit 418. The removable storage unit 418 may include a computer-usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 may read from and/or write to the removable storage unit 418.

Secondary memory 410 may include other means, devices, components, instrumentalities, and/or other approaches for allowing computer programs and/or other instructions and/or data to be accessed by computer system 400. Such means, devices, components, instrumentalities, and/or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 may enable computer system 400 to communicate and interact with any combination of external devices, external networks, external entities, etc. (individually and collectively referenced by reference number 428). For example, communication interface 424 may allow computer system 400 to communicate with external or remote devices 428 over communications path 426, which may be wired and/or wireless (or a combination thereof), and which may include any combination of LANs, WANs, the Internet, etc. Control logic and/or data may be transmitted to and from computer system 400 via communication path 426.

Computer system 400 may also be any of a personal digital assistant (PDA), desktop workstation, laptop or notebook computer, netbook, tablet, smartphone, smartwatch or other wearables, appliance, part of the Internet-of-Things, and/or embedded system, to name a few non-limiting examples, or any combination thereof.

Computer system 400 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats, and/or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), may cause such data processing devices to operate as described herein.

Based on the teachings contained in this disclosure, it will be apparent to persons skilled in the relevant art(s) how to make and use embodiments of this disclosure using data processing devices, computer systems, and/or computer architectures other than that shown in FIG. 4. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

Additionally and/or alternatively, while this disclosure describes exemplary embodiments for exemplary fields and applications, it should be understood that the disclosure is not limited thereto. Other embodiments and modifications thereto are possible and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

One or more parts of the above implementations may include software. Software is a general term whose meaning of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "an aspect," "aspects," "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method for remediating characteristics of composite content generated by a recording application on a user device, the method comprising:

generating the composite content by mixing audio content comprising voice data and background audio data;

identifying an output silence condition for the composite content received via the recording application on the user device that is caused by a characteristic of the composite content;

determining, based on an identifier received with the composite content, a type of the user device;

sending, based on the type of the user device, an instruction to the user device that causes a change in an operational state of at least one of an audio data capturing component of the user device or a video data capturing component of the user device, wherein at least one of the audio data capturing component or the video data capturing component is utilized by the recording application; and sending, to the user device, based on an indication of the change in the operation state of at least one of the audio data capturing component or the video data capturing component, remediation instructions, the remediation instructions comprising at least one of: restarting the recording application or changing the audio data capturing component of the user device, wherein the audio data capturing component is a microphone, that remediate the characteristic of the composite content.

2. The computer-implemented method of claim 1, wherein the characteristic of the composite content comprises at least one of: an amount of zero values associated with the composite content received within a time period satisfy a threshold, an error caused by an overrun scenario for the composite content, an error caused by an underrun scenario for the composite content, or a direct current (DC) offset for the composite content received within another time period with a dynamic range below a threshold.

3. The computer-implemented method of claim 1, wherein the determining the type of the user device further comprises:

accessing user device identification information that indicates types of a plurality of user devices and at least one of software version information for the plurality of user devices or device configuration information for the plurality of user devices, wherein the user device identification information comprises an identifier that indicates the type of the user device and at least one of a software version for the user device or a configuration for the user device; and matching, based on the user device identification information, the identifier received with the composite content to the identifier that indicates the type of the user device and at least one of the software version for the user device or the configuration for the user device.

4. The computer-implemented method of claim 1, further comprising causing, based on the identifying the characteristic of the composite content and the remediation instructions being unavailable for the user device, the user device to display a notification via the recording application that facilitates remediation of the characteristic of the composite content.

5. The computer-implemented method of claim 1, wherein the remediation instructions further comprise: changing a configuration setting for the user device, or selecting a content stream type for the user device.

6. The computer-implemented method of claim 1, further comprising:

identifying a characteristic of additional content received via the recording application on another user device;

determining, based on an identifier received with the additional content, a type of the another user device;

sending, based on the type of the another user device, an instruction to the another user device that causes a change in an operational state of a component of the another user device, wherein the component of the another user device is utilized by the recording application; and sending, to the another user device, based on an indication of the change in the operation state of the component of the another user device, remediation instructions that remediate the characteristic of the additional content, wherein the remediation instructions that remediate the characteristic of the additional content is different from the remediation instructions that remediate the characteristic of the composite content.

7. The computer-implemented method of claim 1, further comprising:

identifying a characteristic of at least a portion of additional content received via the recording application on another user device;

determining, based on an identifier received with the additional content, a type of the another user device; and blocking, based on the type of the another user device being a type of device restricted from sending content via the recording application, the another user device from sending the portion of the additional content.

8. A system for remediating characteristics of composite content generated by a recording application on a user device, the system comprising:

a memory; and at least one processor configured to perform operations comprising:

generating the composite content by mixing audio content comprising voice data and background audio data;

identifying an output silence condition for content received via the recording application on the user device that is caused by a characteristic of the composite content;

determining, based on an identifier received with the composite content, a type of the user device;

sending, based on the type of the user device, an instruction to the user device that causes a change in an operational state of at least one of an audio data capturing component of the user device or a video data capturing component of the user device, wherein at least one of the audio data capturing component or the video data capturing component is utilized by the recording application; and sending, to the user device, based on an indication of the change in the operation state of at least one of the audio data capturing component or the video data capturing component, remediation instructions, the remediation instructions comprising at least one of: restarting the recording application or changing the audio data capturing component of the user device, wherein the audio data capturing component is a microphone, that remediate the characteristic of the composite content.

9. The system of claim 8, wherein the characteristic of the composite content comprises at least one of: an amount of zero values associated with the composite content received within a time period satisfy a threshold, an error caused by an overrun scenario for the composite content, an error caused by an underrun scenario for the composite content, or a direct current (DC) offset for the composite content received within another time period with a dynamic range below a threshold.

10. The system of claim 8, wherein the determining the type of the user device further comprises:

accessing user device identification information that indicates types of a plurality of user devices and at least one of software version information for the plurality of user devices or device configuration information for the plurality of user devices, wherein the user device identification information comprises an identifier that indicates the type of the user device and at least one of a software version for the user device or a configuration for the user device; and matching, based on the user device identification information, the identifier received with the composite content to the identifier that indicates the type of the user device and at least one of the software version for the user device or the configuration for the user device.

11. The system of claim 8, the operations further comprising causing, based on the identifying the characteristic of the composite content and the remediation instructions being unavailable for the user device, the user device to display a notification via the recording application that facilitates remediation of the characteristic of the composite content.

12. The system of claim 8, the remediation instructions further comprising at least one of changing a configuration setting for the user device, or selecting a content stream type for the user device.

13. The system of claim 8, the operations further comprising:

identifying a characteristic of additional content received via the recording application on another user device;

determining, based on an identifier received with the additional content, a type of the another user device;

sending, based on the type of the another user device, an instruction to the another user device that causes a change in an operational state of a component of the another user device, wherein the component of the another user device is utilized by the recording application; and sending, to the another user device, based on an indication of the change in the operation state of the component of the another user device, remediation instructions that remediate the characteristic of the additional content, wherein the remediation instructions that remediate the characteristic of the additional content is different from the remediation instructions that remediate the characteristic of the composite content.

14. The system of claim 8, the operations further comprising:

identifying a characteristic of at least a portion of additional content received via the recording application on another user device;

determining, based on an identifier received with the additional content, a type of the another user device; and blocking, based on the type of the another user device being a type of device restricted from sending content via the recording application, the another user device from sending the portion of the additional content.

15. A non-transitory computer-readable medium having instructions stored thereon that, when executed by at least one computing device, cause the at least one computing device to perform operations for remediating characteristics of composite content generated by a recording application on a user device, the operations comprising:

generating the composite content by mixing audio content comprising voice data and background audio data;

identifying an output silence condition for the composite content received via the recording application on the user device that is caused by a characteristic of the composite content;

determining, based on an identifier received with the composite content, a type of the user device;

sending, based on the type of the user device, an instruction to the user device that causes a change in an operational state of at least one of an audio data capturing component of the user device or a video data capturing component of the user device, wherein at least one of the audio data capturing component or the video data capturing component is utilized by the recording application; and sending, to the user device, based on an indication of the change in the operation state of at least one of the audio data capturing component or the video data capturing component, remediation instructions, the remediation instructions comprising at least one of: restarting the recording application or changing the audio data capturing component of the user device, wherein the audio data capturing component is a microphone, that remediate the characteristic of the composite content.

16. The non-transitory computer-readable medium of claim 15, wherein the characteristic of the composite content comprises at least one of: an amount of zero values associated with the composite content received within a time period satisfy a threshold, an error caused by an overrun scenario for the composite content, an error caused by an underrun scenario for the composite content, or a direct current (DC) offset for the composite content received within another time period with a dynamic range below a threshold.

17. The non-transitory computer-readable medium of claim 15, wherein the determining the type of the user device further comprises:

accessing user device identification information that indicates types of a plurality of user devices and at least one of software version information for the plurality of user devices or device configuration information for the plurality of user devices, wherein the user device identification information comprises an identifier that indicates the type of the user device and at least one of a software version for the user device or a configuration for the user device; and matching, based on the user device identification information, the identifier received with the composite content to the identifier that indicates the type of the user device and at least one of the software version for the user device or the configuration for the user device.

18. The non-transitory computer-readable medium of claim 15, the operations further comprising causing, based on the identifying the characteristic of the composite content and the remediation instructions being unavailable for the user device, the user device to display a notification via the recording application that facilitates remediation of the characteristic of the composite content.

19. The non-transitory computer-readable medium of claim 15, the remediation instructions further comprising: change changing a configuration setting for the user device, or selecting a content stream type for the user device.

20. The non-transitory computer-readable medium of claim 15, the operations further comprising:

identifying a characteristic of at least a portion of additional content received via the recording application on another user device;

determining, based on an identifier received with the additional content, a type of the another user device; and blocking, based on the type of the another user device being a type of device restricted from sending content via the recording application, the another user device from sending the portion of the additional content.

\* \* \* \* \*